(12) United States Patent
Schefe et al.

(10) Patent No.: US 9,766,984 B2
(45) Date of Patent: *Sep. 19, 2017

(54) N TO M HOST SYSTEM COPY

(71) Applicant: SAP SE, Walldorf (DE)

(72) Inventors: Andre Schefe, Berlin (DE);
Hans-Georg Bumes, Berlin (DE);
Robin Wissbrock, Berlin (DE);
Torsten Strahl, Kleinmachnow (DE)

(73) Assignee: SAP SE, Walldorf (DE)

( * ) Notice: Subject to any disclaimer, the term of this patent is extended or adjusted under 35 U.S.C. 154(b) by 5 days.

This patent is subject to a terminal disclaimer.

(21) Appl. No.: 14/819,678

(22) Filed: Aug. 6, 2015

(65) Prior Publication Data

US 2015/0347237 A1 Dec. 3, 2015

Related U.S. Application Data

(63) Continuation of application No. 13/925,496, filed on Jun. 24, 2013, now Pat. No. 9,110,847.

(51) Int. Cl.
*G06F 17/00* (2006.01)
*G06F 11/14* (2006.01)
*G06F 17/30* (2006.01)

(52) U.S. Cl.
CPC ...... *G06F 11/1456* (2013.01); *G06F 11/1448* (2013.01); *G06F 11/1464* (2013.01); *G06F 17/303* (2013.01); *G06F 17/30575* (2013.01); *G06F 2201/84* (2013.01)

(58) Field of Classification Search
None
See application file for complete search history.

(56) References Cited

U.S. PATENT DOCUMENTS

| | | | |
|---|---|---|---|
| 8,224,931 B1 * | 7/2012 | Brandwine | H04L 41/5051 370/255 |
| 8,484,163 B1 * | 7/2013 | Yucel | G06F 17/30289 370/216 |
| 8,966,027 B1 * | 2/2015 | Brandwine | G06F 9/45533 709/200 |
| 9,185,000 B2 * | 11/2015 | Mabilleau | F24H 7/00 |
| 9,201,887 B1 * | 12/2015 | Earl | G06F 17/30088 |
| 9,282,027 B1 * | 3/2016 | Brandwine | H04L 45/04 |
| 2007/0203958 A1 * | 8/2007 | Suzuki | G06F 11/2048 |
| 2009/0248755 A1 * | 10/2009 | Watanabe | G06F 1/3209 |
| 2009/0248759 A1 * | 10/2009 | Okada | G06F 11/1456 |
| 2009/0313503 A1 * | 12/2009 | Atluri | G06F 11/1453 714/19 |
| 2010/0211821 A1 * | 8/2010 | Donie | G06F 11/1658 714/6.11 |
| 2012/0016839 A1 * | 1/2012 | Yueh | G06F 11/1435 707/624 |

(Continued)

*Primary Examiner* — Hung Le
(74) *Attorney, Agent, or Firm* — Buckley, Maschoff & Talwalkar LLC (57) ABSTRACT

A system includes obtaining of a backup of the source database system comprising N hosts and a first plurality of servers, where N is an integer greater than one, access of a target database system comprising M hosts, where M is an integer less than N, configuration of the target database system to include the first plurality of servers, and performance of a database recovery of the target database system using the backup of the source database system.

12 Claims, 7 Drawing Sheets

(56) References Cited

U.S. PATENT DOCUMENTS

| | | | |
|---|---|---|---|
| 2012/0084524 A1* | 4/2012 | Gokhale | G06F 17/30466 711/162 |
| 2014/0130160 A1* | 5/2014 | Golovanov | H04L 63/1441 726/23 |
| 2014/0153383 A1* | 6/2014 | Mabilleau | F24H 7/00 370/222 |
| 2014/0181443 A1* | 6/2014 | Kottomtharayil | G06F 11/1458 711/162 |
| 2015/0254150 A1* | 9/2015 | Gordon | G06F 11/1662 714/6.3 |
| 2015/0347237 A1* | 12/2015 | Schefe | G06F 11/1448 707/652 |

\* cited by examiner

N TO M HOST SYSTEM COPY

CROSS REFERENCE TO RELATED APPLICATION

This is a continuation of co-pending prior U.S. patent application Ser. No. 13/925,496 filed Jun. 24, 2013, the entire contents of which are incorporated herein.

BACKGROUND

Modern database systems provide processes for generating database backups and for using such backups to recover from database crashes. These backups may also be used to copy a database to a second database system. More specifically, the backups generated by a first database system are used to perform a database recovery operation on the second database system. As a result, the second database system is a copy of the first database system at the time of the backup generation. The foregoing operation is unavailable if the number of hosts within the first database system is different from the number of hosts within the second database system.

DETAILED DESCRIPTION

The following description is provided to enable any person in the art to make and use the described embodiments and sets forth the best mode contemplated for carrying out some embodiments. Various modifications, however, will remain readily apparent to those in the art.

Figure 1:
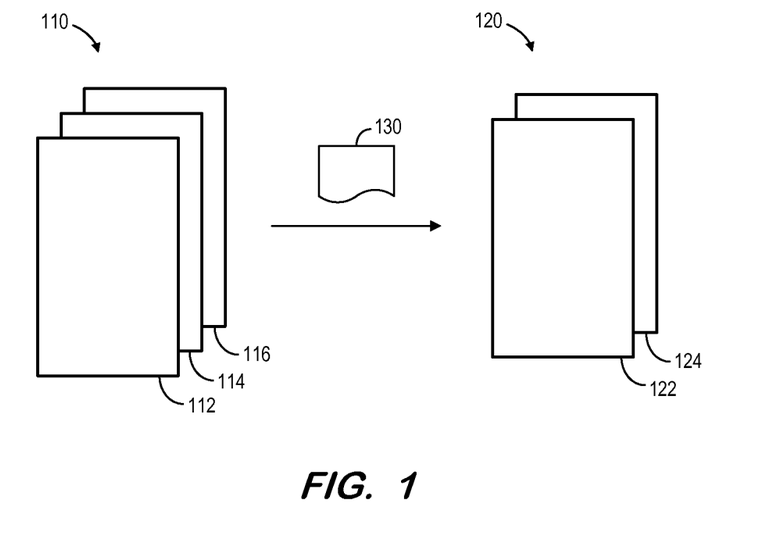
FIG. 1 is a block diagram illustrating operation according to some embodiments.

FIG. 1 is a block diagram including database system 110, database system 120 and backup 130. Backup 130 was generated during a backup operation of system 110. FIG. 1 generally illustrates the operation of copying database system 110 onto database system 120 using backup 130.

Database system 110 includes hosts 112, 114 and 116. One of hosts 112, 114 and 116 is designated a Master while the other two are designated as Workers. The data stored within the memories of hosts 112, 114 and 116, taken together, represent the full database of database system 110.

Similarly, database system 120 includes hosts 122 and 124, with one host designated a Master and the other host designated a Worker. According to some embodiments, database system 110 is a production system which is used to provide database services during the course of business, while database system 120 is used for Quality Assurance and/or development. Accordingly, database system 120 includes only two hosts in order to save on hardware costs.

In this regard, each host of FIG. 1 includes at least one processor and a memory device, and is responsible for managing a dedicated portion of physical memory, regardless of where that physical memory is located. In some embodiments, the memory of hosts 112, 114 116, 122 and 124 is implemented in Random Access Memory (e.g., cache memory for storing recently-used data) and one or more fixed disks (e.g., persistent memory for storing their respective portions of the full database). Alternatively, one or more of hosts 112, 114, 116, 122 and 124 may implement an "in-memory" database, in which volatile (e.g., non-disk-based) memory (e.g., Random Access Memory) is used both for cache memory and for storing its entire respective portion of the full database. In some embodiments, the data of the full database may comprise one or more of conventional row-based data, column-based data, and object-based data.

Backup 130 comprises one or more elements generated during a backup of system 110. Backup 130 may therefore comprise one or more files within a file system or an electronic structure created by a backup tool, in any size and/or format, which may be used to recover system 110 to its pre-backup state. As mentioned in the Background, it is desired to use backup 130 to create a copy of system 110 within system 120.

Figure 2:
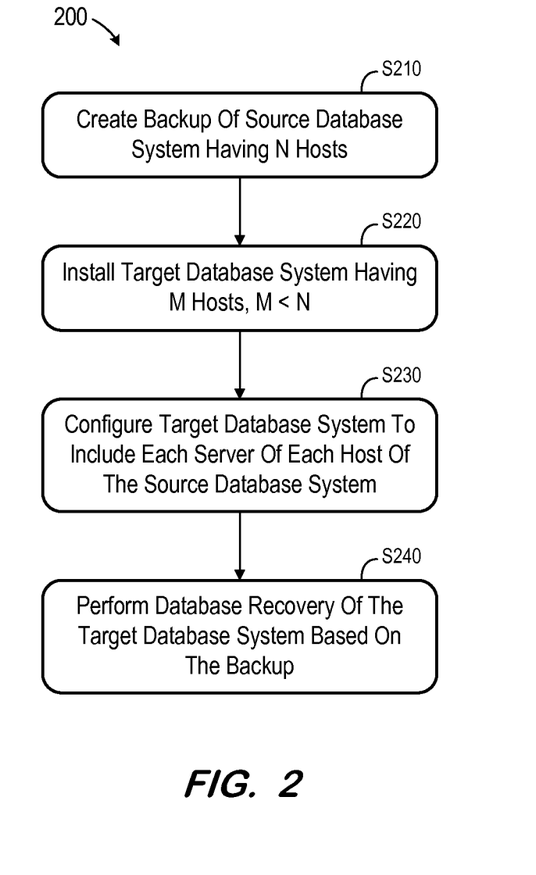
FIG. 2 is a flow diagram of a process according to some embodiments.

FIG. 2 comprises a flow diagram of process 200 according to some embodiments. In some embodiments, various hardware elements of system 120 execute program code to perform process 200. Process 200 and all other processes mentioned herein may be embodied in processor-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Initially, at S210, a backup of a source database system is created. S210 may comprise any type of backup operation that is or becomes known, and the backup which is created at S210 may comprise any number and/or type of electronic structure.

In one example of S210, a database administrator logs on to the source database system via an administration device and interface, and issues an instruction to create a backup. Such an interface may be generated and displayed by an application executing on the administration device, may comprise a Web page or other interface provided to the administration device by the source database system and displayed thereby, or may be displayed by any other means.

The source database system includes N hosts, N being a positive integer. According to some embodiments, each of the N hosts of the source database system executes one or more services. Each service is associated with particular data of the source database system. Creation of a backup at S210 may therefore include generation of a data backup for each service, which backs up the particular data associated with the service.

Figure 3:
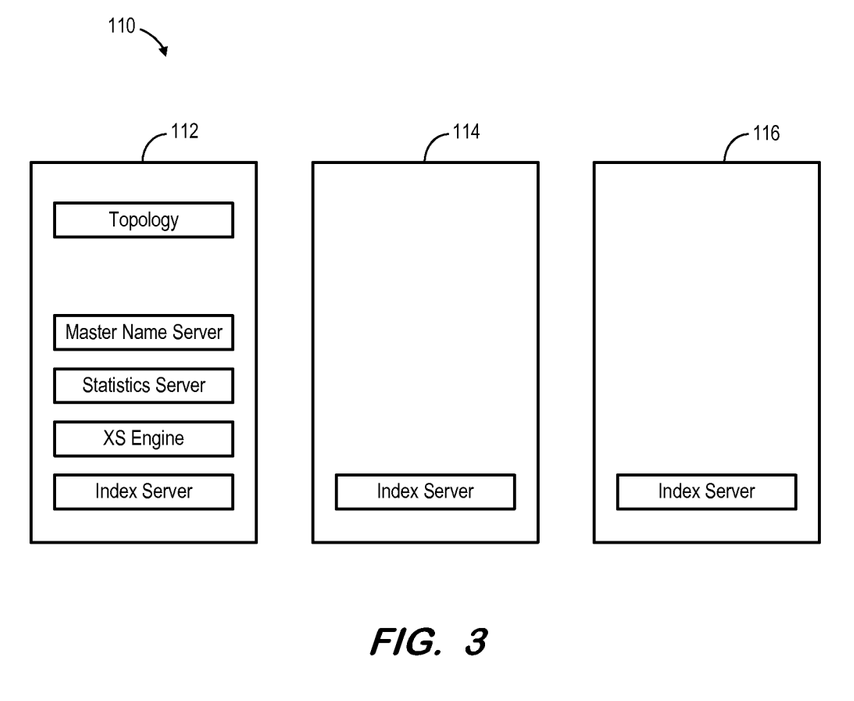
FIG. 3 is a block diagram of a source database system according to some embodiments.

FIG. 3 illustrates one implementation of database system 110 of FIG. 1, for use in describing an example of process 200 according to some embodiments. As shown, Master host 112 includes a master name server, a statistics server, an XS engine, and an index server. Hosts 114 and 116 each include a respective index server. As described above, creation of a data backup of database system 110 of FIG. 3 includes creation of a first data backup associated with the master name server, a second data backup associated with the statistics server, a third data backup associated with the XS engine, a fourth data backup associated with the index server of host 112, a fifth data backup associated with the index server of host 114, and a sixth data backup associated with the index server of host 116.

Master host 112 also includes a topology file describing the topology of database system 110. The topology is stored in the data volume of the master name server and is therefore backed-up as part of the data backup associated with the master name server. According to some embodiments, the topology is also backed up separately as a seventh data backup.

Returning to process 200, a target database system is installed at S220. The target database system includes M hosts, with M being an integer<N. Installation of the target database system may occur prior to S210 according to some embodiments.

In one example, installation of the target database system includes loading program code onto selected hardware and using an administration interface to define hosts and services of the target database system. The host definition may be specified in a "nameserver.ini" file which is visible across the entire target database system. The nameserver.ini file lists all hosts and their respective roles (e.g., Master, Worker or Standby). Each host is further associated with a dedicated "daemon.ini" file which contains a list of services which will be started by a host-specific daemon when the host starts.

Figure 4:
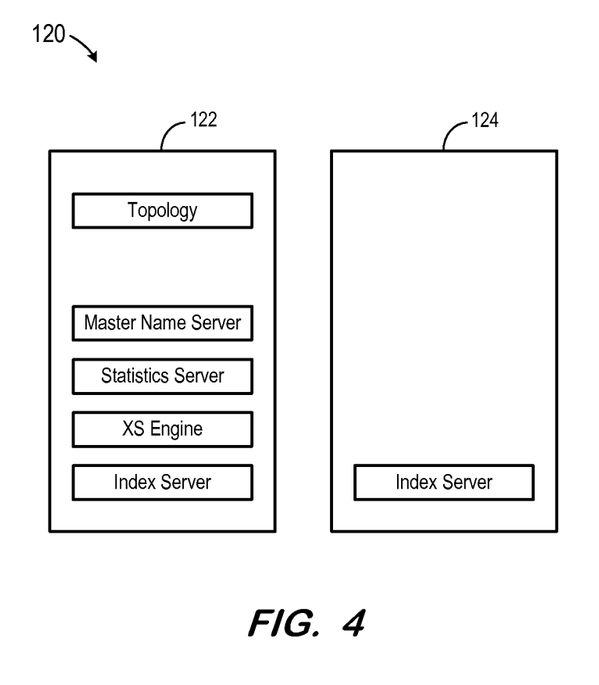
FIG. 4 is a block diagram of a target database system according to some embodiments.

FIG. 4 illustrates an implementation of database system 120 of FIG. 1, for use in describing an example of a target database system according to some embodiments. Target database system 120 includes M=2 hosts. Master host 122 includes a master name server, a statistics server, an XS engine, and an index server, while host 124 includes an index server.

Figure 5:
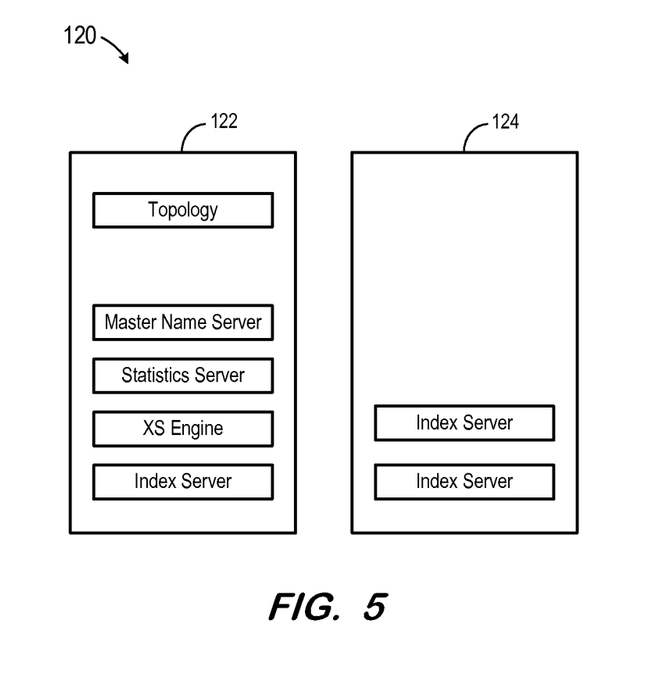
FIG. 5 is a block diagram of a target database system according to some embodiments.

At S230, the target database system is configured to include each server of each host of the source database system. Configuration at S230 may include modifying one or more daemon.ini files to specify one or more additional services on the corresponding hosts. With respect to the present example, target database system 120 includes each service of source database system 110, with the exception of one index server. Accordingly, at S230, target database system 120 is configured to add an additional index server. FIG. 5 shows the services of target system 120 after S230 according to some embodiments. As shown, an additional index server has been added to host 124.

According to some embodiments, target database system 120 may provide a design studio to allow reconfiguration of the target database system via graphical user interfaces displayed on an administration device. In other embodiments, S230 may be executed by transmitting a corresponding Structured Query Language statement to database system 120 via an administration device. For example, to add one indexserver service to the host 'lu4711' the following statement may be used in some embodiments:

ALTER SYSTEM ALTER CONFIGURATION ('daemon.ini','host', 'lu4711') set('indexserver.c','instanceids')='40' with reconfigure Next, at S240, a database recovery is performed on the target database system based on the backup. For example, the backup files created at S210 are used in conjunction with a recovery operation executing on the target database system. As a result, the target database system is a functional copy of the source database system as it existed immediately prior to the backup operation of S210.

Figure 6:
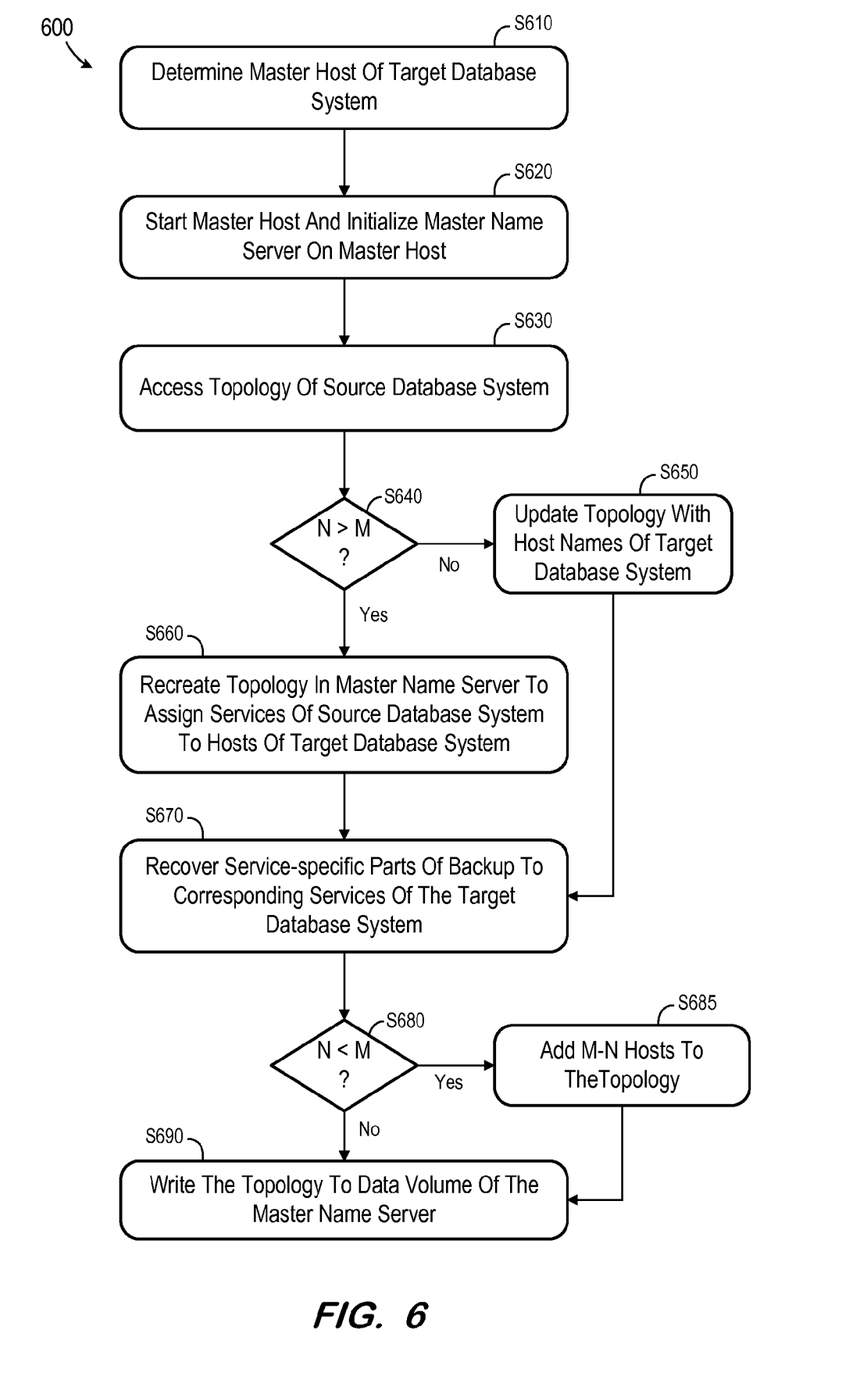
FIG. 6 is a flow diagram of a process according to some embodiments.

FIG. 6 is a flowchart of process 600 to perform database recovery on a target database system according to some implementations of S240. Initially, at 610, a Master host of the target database system is determined. The Master host may be determined from the nameserver.ini file of the target database system.

Next, at S620, the Master host is started and the master name server on the Master host is initialized. The master name server receives a recovery statement in order to begin the recovery operation.

The backed-up topology of the source database system is accessed at S630. As described above, the topology is backed up independently of the service-specific data backups of the source database system. The topology is stored in main memory (e.g., Random Access Memory) of the target database system.

At S640, it is determined whether the source database system includes more hosts than the target database system. The number of hosts of the target database system is determined based on the Worker tag in the nameserver.ini file. If the source database system does not include more hosts than the target database system, flow proceeds to S650 to update the stored topology with the host names of the target database system. These names may be listed in the nameserver.ini file as mentioned above. Updating the topology may simply consist of substituting the host names of the source database system with the host names of the target database system. Flow then continues to S670.

Alternatively, flow proceeds from S640 to S660 if the source database system includes more hosts than the target database system. At S660, a new topology is created in the main memory of master name server of the target database system. The new topology include hosts as specified in the nameserver.ini file of the target database system. Also, the topology assigns the database services listed in the daemon.ini file to the specified hosts, for example in round-robin fashion. As mentioned above, the daemon.ini file of the target database system was previously reconfigured to include the services of the source database system (e.g., at S230). Accordingly, the recreated topology includes all of the services of the source database system, distributed among the hosts of the target database system.

Next, at S670, a recovery operation is performed on the target database using the backup files and the updated topology. The service-specific parts of the backup job are recovered to the corresponding services of the target database system. For example, the master name server data backup is recovered to the master name server of the target database system. With respect to the example of FIGS. 3 and 5, the backups for two of the index servers of system 110 are recovered to the index servers of host 124 of system 120.

After completion of the recovery operation, it is determined at S680 whether source database system includes fewer hosts than the target database system. As mentioned above, the number of hosts of the target database system may be determined based on the Worker tag in the nameserver.ini file. If the source database system includes fewer hosts than the target database system, flow proceeds to S685 to update the stored topology to include the additional (i.e., as-yet unused) host names of the target database system.

Flow proceeds to S690 from S685 or after a negative determination at S680. The new topology is written to the data volume of the master name server of the target database system at S690. The topology is thus persisted such that each subsequent restart of the target database system will use that topology.

Figure 7:
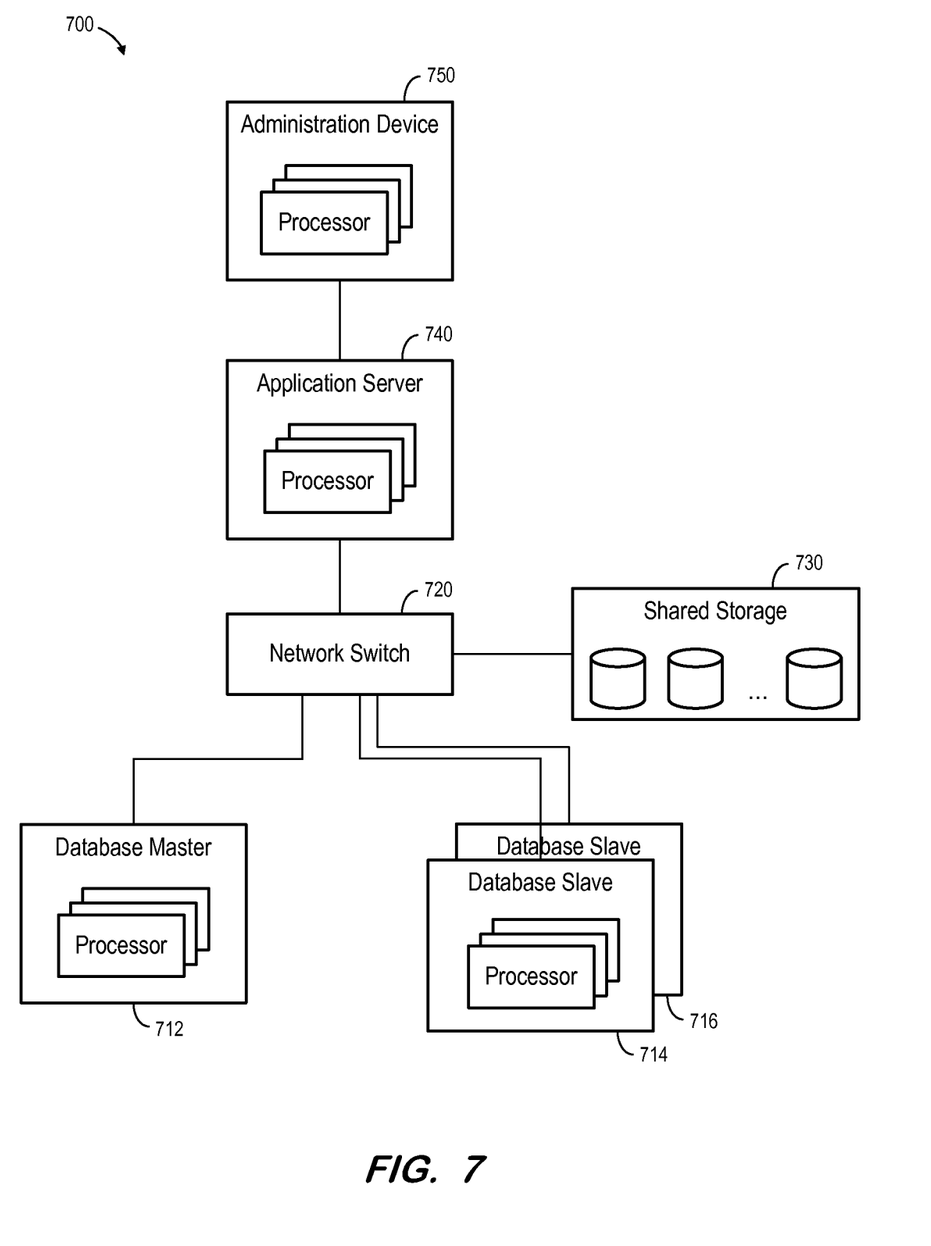
FIG. 7 is a block diagram of a computing system according to some embodiments.

FIG. 7 is a block diagram of system 700 according to some embodiments. System 700 illustrates one hardware architecture implementing system 110 and/or 120 as described above, but implementations of either system 110 or 120 are not limited thereto. Elements of system 700 may therefore operate to execute process 200 and/or 600 as described above.

Database master 712 and each of database workers 714 and 716 may comprise a multi-processor "blade" server. Each of database master 712 and database workers 714 and 716 may operate as described herein with respect to database hosts, and database master 712 may perform additional transaction management functions and other master server functions which are not performed by database workers 714 and 716 as is known in the art.

According to some embodiments, hosts 712, 714 and 716 each execute processes to provide the data of a full database to database applications. More specifically, database system 700 may communicate with one or more database applications over one or more interfaces (e.g., a Structured Query Language (SQL)-based interface) in order to provide data thereto.

Application server 740 may also comprise a multi-processor blade server. Application server 740, as described above, may execute database applications to provide functionality to end users operating user devices, such as business reporting, inventory control, online shopping, and/or any other suitable functions. Application server 740 may also receive administrative instructions from administration device 750 according to some embodiments. Such instructions may comprise instructions to execute backup and/or recovery operations, to update a topology, etc.

Database master 712 and database workers 714 and 716 are connected via network switch 720, and are thereby also connected to shared storage 730. Shared storage 730 and all other memory mentioned herein may comprise any appropriate non-transitory storage device, including combinations of magnetic storage devices (e.g., magnetic tape, hard disk drives and flash memory), optical storage devices, Read Only Memory (ROM) devices, etc.

Shared storage 730 may comprise the persistent storage of a database instance distributed among database master 712 and database workers 714 and 716. As such, various portions of the data within shared storage 730 may be allotted (i.e., managed by) one of database master 712 and database workers 714 and 716.

The data of database system 700 may be received from disparate hardware and software systems, some of which are not interoperational with one another. The systems may comprise a back-end data environment employed in a business or industrial context. The data may be pushed to database system 700 and/or provided in response to queries received therefrom.

Database system 700 and each element thereof may also include other unshown elements that may be used during operation thereof, such as any suitable program code, scripts, or other functional data that is executable to interface with other elements, other applications, other data files, operating system files, and device drivers. These elements are known to those in the art, and are therefore not described in detail herein.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of devices in communication via any number of other public and/or private networks. Two or more of such computing devices may be located remote from one another and may communicate with one another via any known manner of network(s) and/or a dedicated connection. Each device may comprise any number of hardware and/or software elements suitable to provide the functions described herein as well as any other functions. For example, any computing device used in an implementation of system 100 may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those skilled in the art will recognize other embodiments may be practiced with modifications and alterations to that described above.

What is claimed is:

1. A computing system comprising:
a source database system comprising N hosts and associated with a first plurality of database services, where N is an integer greater than one, the source database system comprising:
a first memory storing first processor-executable program code; and
a first processor to execute the first processor-executable program code in order to cause the source database system to:
create a backup of the source database system; and
a target database system comprising M hosts, where M is an integer less than N, the target database system comprising:
a second memory storing second processor-executable program code; and
a second processor to execute the second processor-executable program code in order to cause the target database system to:
read a topology of the source database system from the backup, the topology assigning the first plurality of database services to the N hosts and the reading of the topology of the source database system from the backup including:
starting of a master host of the target database system;
initialization of a master name server of the master host; and
reading of the topology from the master name server, the topology of the source database being backed up independently of service-specific parts of the backup of the source database system;
configure the M hosts of the target database system to include the first plurality of database services; and
perform a database recovery of the target database system using the backup of the source database system.

2. A computing system according to claim 1, wherein, prior to the configuration of the target database system, the target database system is associated with a second plurality of database services different from the first plurality of database services.

3. A computing system according to claim 1, wherein performance of the database recovery of the target database system comprises:
   recovery of service-specific parts of the backup to corresponding ones of the first plurality of database services of the target database system.

4. A computing system according to claim 1, wherein performance of the database recovery of the target database system comprises:
   recovery of service-specific parts of the backup to corresponding ones of the first plurality of database services of the target database system.

5. A non-transitory computer-readable medium storing program code, the program code executable by a processor of a computing system to cause the computing system to:
   obtain a backup of the source database system comprising N hosts and associated with a first plurality of database services, where N is an integer greater than one;
   access a target database system comprising M hosts, where M is an integer less than N;
   read a topology of the source database system from the backup, the topology assigning the first plurality of database services to the N hosts and the reading of the topology of the source database system from the backup including:
      starting of a master host of the target database system;
      initialization of a master name server of the master host; and
      reading of the topology from the master name server, the topology of the source database being backed up independently of service-specific parts of the backup of the source database system;
   configure the M hosts of the target database system to include the first plurality of database services; and
   perform a database recovery of the target database system using the backup of the source database system.

6. A non-transitory computer-readable medium according to claim 5, wherein, prior to the configuration of the target database system, the target database system is associated with a second plurality of database services different from the first plurality of database services.

7. A non-transitory computer-readable medium according to claim 5, wherein performance of the database recovery of the target database system comprises:
   recovery of service-specific parts of the backup to corresponding ones of the first plurality of database services of the target database system.

8. A non-transitory computer-readable medium according to claim 5, wherein performance of the database recovery of the target database system comprises:
   recovery of service-specific parts of the backup to corresponding ones of the first plurality of database services of the target database system.

9. A computer-implemented method comprising:
   obtaining a backup of the source database system comprising N hosts and associated with a first plurality of database services, where N is an integer greater than one;
   accessing a target database system comprising M hosts, where M is an integer less than N;
   reading a topology of the source database system from the backup, the topology assigning the first plurality of database services to the N hosts and the reading the topology of the source database system from the backup including:
      starting a master host of the target database system;
      initializing a master name server of the master host; and
      reading the topology from the master name server, the topology of the source database being backed up independently of service-specific parts of the backup of the source database system;
   configuring the M hosts of the target database system to include the first plurality of database services; and
   performing a database recovery of the target database system using the backup of the source database system.

10. A computer-implemented method according to claim 9, wherein, prior to the configuration of the target database system, the target database system is associated with a second plurality of database services different from the first plurality of database services.

11. A computer-implemented method according to claim 9, wherein performance of the database recovery of the target database system comprises:
   recovering service-specific parts of the backup to corresponding ones of the first plurality of database services of the target database system.

12. A computer-implemented method according to claim 9, wherein performing the database recovery of the target database system comprises:
   recovering service-specific parts of the backup to corresponding ones of the first plurality of database services of the target database system.

* * * * *